United States Patent [19]

Capers et al.

[11] Patent Number: 4,669,596
[45] Date of Patent: Jun. 2, 1987

[54] VENDING MACHINE ACCESSORY PERMITTING DUAL MODE MACHINE OPERATION WITH EITHER MONEY OR CODED CARDS

[75] Inventors: Joseph G. Capers, Brentwood; Kenneth E. Korando, Peagram, both of Tenn.

[73] Assignee: Debitek, Inc., Brentwood, Tenn.

[21] Appl. No.: 790,254

[22] Filed: Oct. 22, 1985

[51] Int. Cl.⁴ .............................................. G07F 7/08
[52] U.S. Cl. .................................... 194/210; 194/217; 235/381; 439/651
[58] Field of Search ............... 194/205, 210, 216, 217, 194/218; 235/381; 364/479; 339/166 R, 159 R, 159 C

[56] References Cited

U.S. PATENT DOCUMENTS

| | | | |
|---|---|---|---|
| 3,054,024 | 9/1962 | Van Dillen et al. | 339/166 R X |
| 3,123,428 | 3/1964 | McKee | 339/166 R X |
| 3,560,715 | 2/1971 | Akamatsu | 235/61.8 |
| 3,570,643 | 3/1971 | Maierhofer | 194/213 |
| 3,575,271 | 4/1971 | Constable | 194/210 |
| 3,653,480 | 4/1972 | Yamamoto et al. | 194/210 |
| 3,774,743 | 11/1973 | Hendrickson | 194/210 |
| 3,836,753 | 9/1974 | Pass | 235/61.11 |
| 3,901,366 | 8/1975 | Schuller et al. | 194/210 |
| 3,935,933 | 2/1976 | Tanaka et al. | 194/210 |
| 3,943,563 | 3/1976 | Lemelson | 360/35 |
| 4,020,325 | 4/1977 | Pfost et al. | 235/61.7 |
| 4,386,820 | 6/1983 | Dola et al. | 339/166 R X |
| 4,412,292 | 10/1983 | Sedam et al. | 364/479 |

FOREIGN PATENT DOCUMENTS 52-28396  3/1977  Japan .................................. 194/205

Primary Examiner—F. J. Bartuska
Attorney, Agent, or Firm—Howson and Howson

[57] ABSTRACT

An accessory for permitting a vending machine to operate with either money or coded cards. The accessory is mounted to the outside of a vending machine and connected internally by means of an adapter electrically connected between the money handling unit and item dispensing unit of the vending machine. The accessory reads the credit value coded on the card, compares the same with the price of the item selected, actuates the item dispenser, deducts the price of the item dispensed from the amount originally coded on the card, and encodes a new value on the card as it is withdrawn. Other features are also disclosed.

14 Claims, 7 Drawing Figures

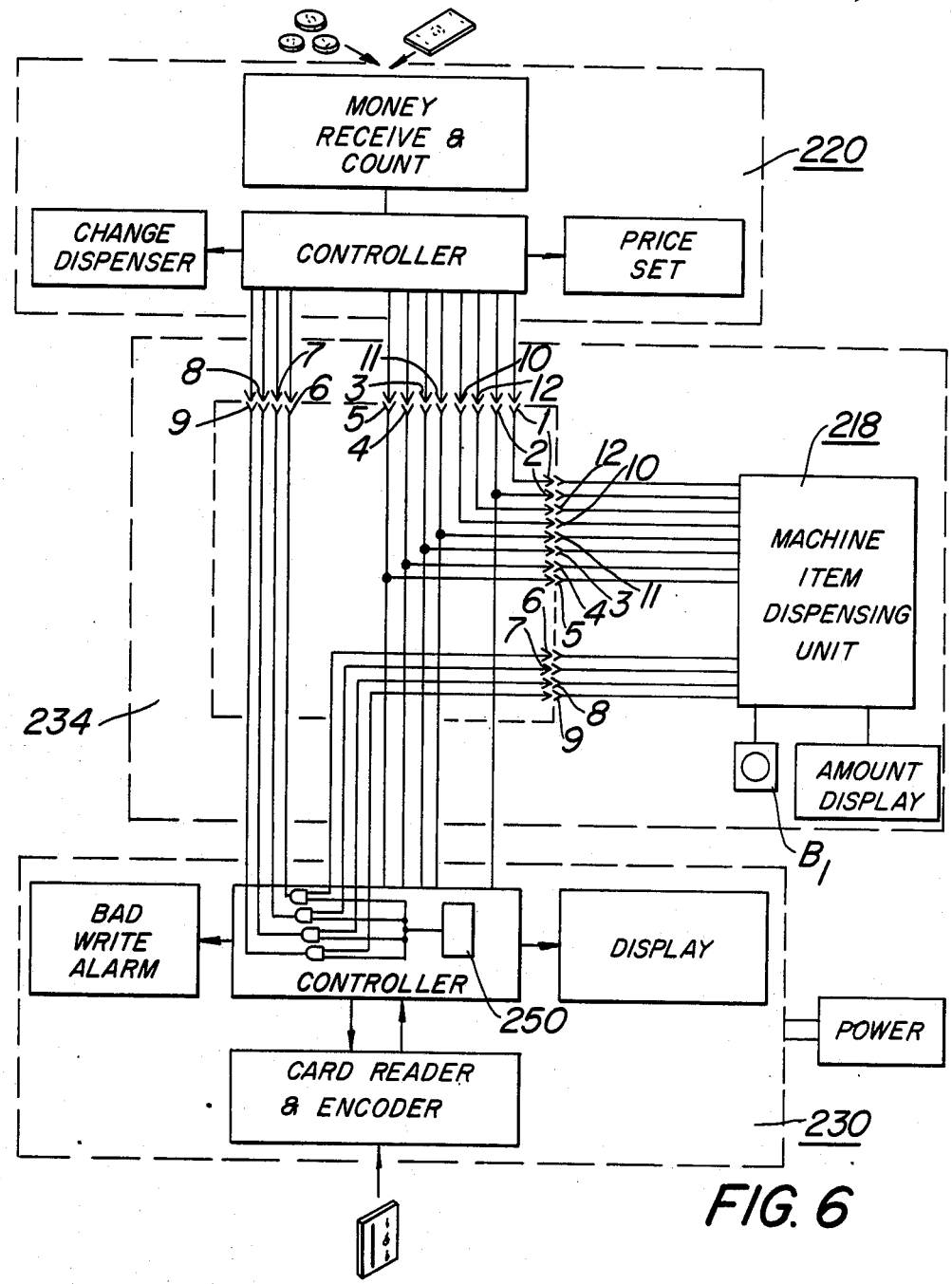
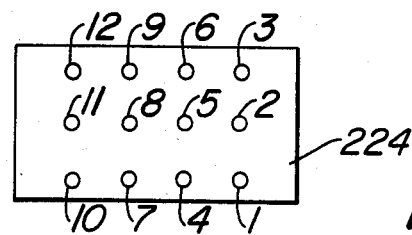
FIG. 6
FIG. 7

VENDING MACHINE ACCESSORY PERMITTING DUAL MODE MACHINE OPERATION WITH EITHER MONEY OR CODED CARDS

FIELD OF THE INVENTION

The present invention relates to vending machines, and more particularly, the present invention relates to an accessory for use with conventional vending machines to enable them to be retrofitted to operate either with money or with a coded card.

BACKGROUND OF THE INVENTION

At present, there are in excess of sixteen million vending machines in use in this country, dispensing various types of products, including food, drink, and the like when money is placed in the machine and a selection is made. Older machines require coins. Some newer machines operate with either coins or bills.

While conventional money operated vending machines have proven satisfactory, they have certain limitations. For instance, there are pilferage problems, problems in detecting counterfeit coins, etc. Also, there is the problem of purchasers having to have cash available to make a purchase, and occasionally, even exact change.

In an increasingly credit card oriented society, a vending machine capable of being operated with either money or coded cards is desirable, and apparatus which enables existing vending machines to be retrofitted for such purposes is highly desirable.

OBJECTS OF THE INVENTION

With the foregoing in mind, a primary object of the present invention is to provide an improved vending machine which is capable of being operated with either money or a coded card.

Another object of the present invention is to provide a novel accessory which enables many types of existing money operated vending machines to be retrofitted so that they are capable of being operated with either money or a coded card.

A further object of the present invention is to provide a unique coded card handling accessory which can be connected to an existing vending machine quickly and easily without requiring special skills or special tools.

Yet another object of the present invention is to provide a vending machine coded card handling unit which is compatible with many types of conventional vending machines and which is designed to be electrically interconnected quickly using standard electrical couplings in the vending machines.

SUMMARY OF THE INVENTION

More specifically, the present invention provides an accessory for use with a conventional vending machine to enable it to be operated with either money or a coded card. The accessory includes a housing which is adapted to be mounted to the vending machine and electrically interconnected therewith by means of a cable and adapter. The adapter matingly engages between plug and socket means connecting the money handling unit and item dispensing unit within the vending machine. The accessory includes means for reading data encoded on a card, means for comparing the encoded data with price information and for transmitting an output signal to the item dispensing unit when the encoded amount equals or exceeds the amount of the item selected by the purchaser. The accessory also includes means for displaying the encoded amount, means for subtracting the amount of the item selected from the encoded amount, and means for reencoding the card at the completion of the vend cycle. When used in combination with certain types of vending machines, the accessory enables the credit amount encoded on the card to be increased simply by depositing money in the vending machine.

BRIEF DESCRIPTION OF THE DRAWINGS

The foregoing and other objects, features and advantages of the present invention should become apparent from the following description when taken in conjunction with the accompanying drawings, in which:

FIG. 6 is a schematic diagram similar to FIGS. 2 and 4 but illustrating a micro-mech type of vending machine interconnect; and FIG. 7 is a plan view of hole locations in a micro-mech machine dispensing unit socket.

DESCRIPTION OF THE PREFERRED EMBODIMENTS

Figure 1:
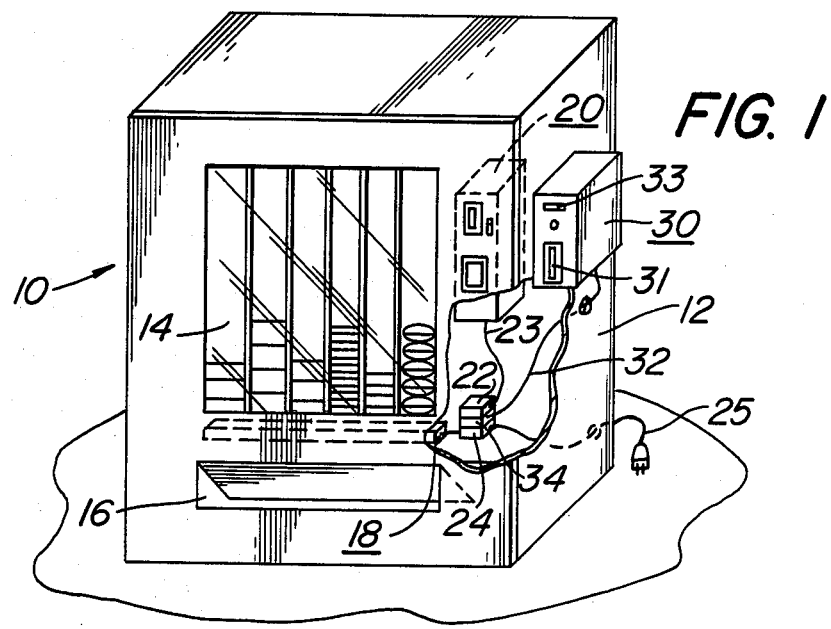
FIG. 1 is a perspective view of a conventional single-price vending machine having dual mode operational capabilities, the view illustrating the vending machine partially broken away to illustrate the manner in which the coded card handling accessory of the present invention is mounted on the outside of the machine and is connected internally of the machine to its conventional components.

Referring now to the drawings, FIG. 1 illustrates a vending machine 10 embodying the present invention. The vending machine 10 includes a cabinet 12 of conventional construction having an item display section 14 below which is located an item delivery chute 16. Conventional item dispensing means indicated generally at 18 functions when actuated to cause a selected item to drop from the display section 14 to the delivery chute 16 when money is placed in a money handling unit 20 mounted inside the cabinet 12.

The money handling unit 20 is connected to the item dispensing unit 18 by a releasable connection which, in the illustrated embodiment, is provided by a plug 22 connected to the money handling unit 20 by a cable 23 and a socket 24, either formed integral with the item dispensing unit 18 as shown, or connected thereto by a suitable cable. Power is supplied to the vending machine 10 by means of a cord 25 connected into the item dispensing unit 18, and, when the plug 22 is engaged in the socket 24, power is also to be supplied to the money handling unit 20.

In the embodiment of FIG. 1, when money, such as a coin, is deposited in the slot of the money handling unit 20, the unit 20 counts the money, compares the counted money with the preset price, and if the amount deposited is sufficient, sends a signal to the item dispensing unit 18 to cause a selected item to be delivered to the delivery chute 16.

There are various types of vending machines. For instance, there are so-called single-price machines, ten-price machines, micro-mech machines, multi-price machines, and four-price machines. Disclosed herein is the present invention used with single-price, ten-price and micro-mech machines.

Figure 3:
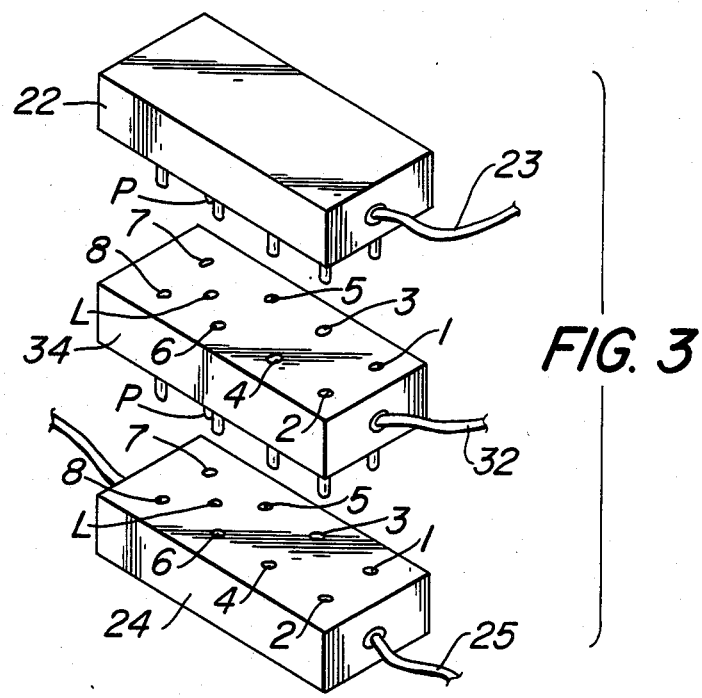
FIG. 3 is an exploded, fragmentary perspective view illustrating an accessory adapter interposed between conventional vending machine connectors.

Turning first to the so-called single-price vending machine, a certain convention has been developed by various vending machine manufacturers with respect to the plug and socket interconnection 22, 24 utilized to connect the money handling unit 20 to the item dispensing unit 18. For example, as best seen in FIG. 3, the socket 24 of the single-price machine 10 has eight holes designated by convention to have certain position numbers 1–8 with respect to a locator hole L. In a like manner, the plug 22 is provided with a series of depending pins which releasably matingly engage the holes in the socket 24 and which likewise has a locating pin P adapted to be received in the locator hole L. The pins 1–8 of the plug 22 are electrically connected in a particular manner to the money handling unit 20, and the holes 1–8 in the item dispensing unit 18 are electrically connected in a particular manner to the item dispensing unit 18.

Figure 2:
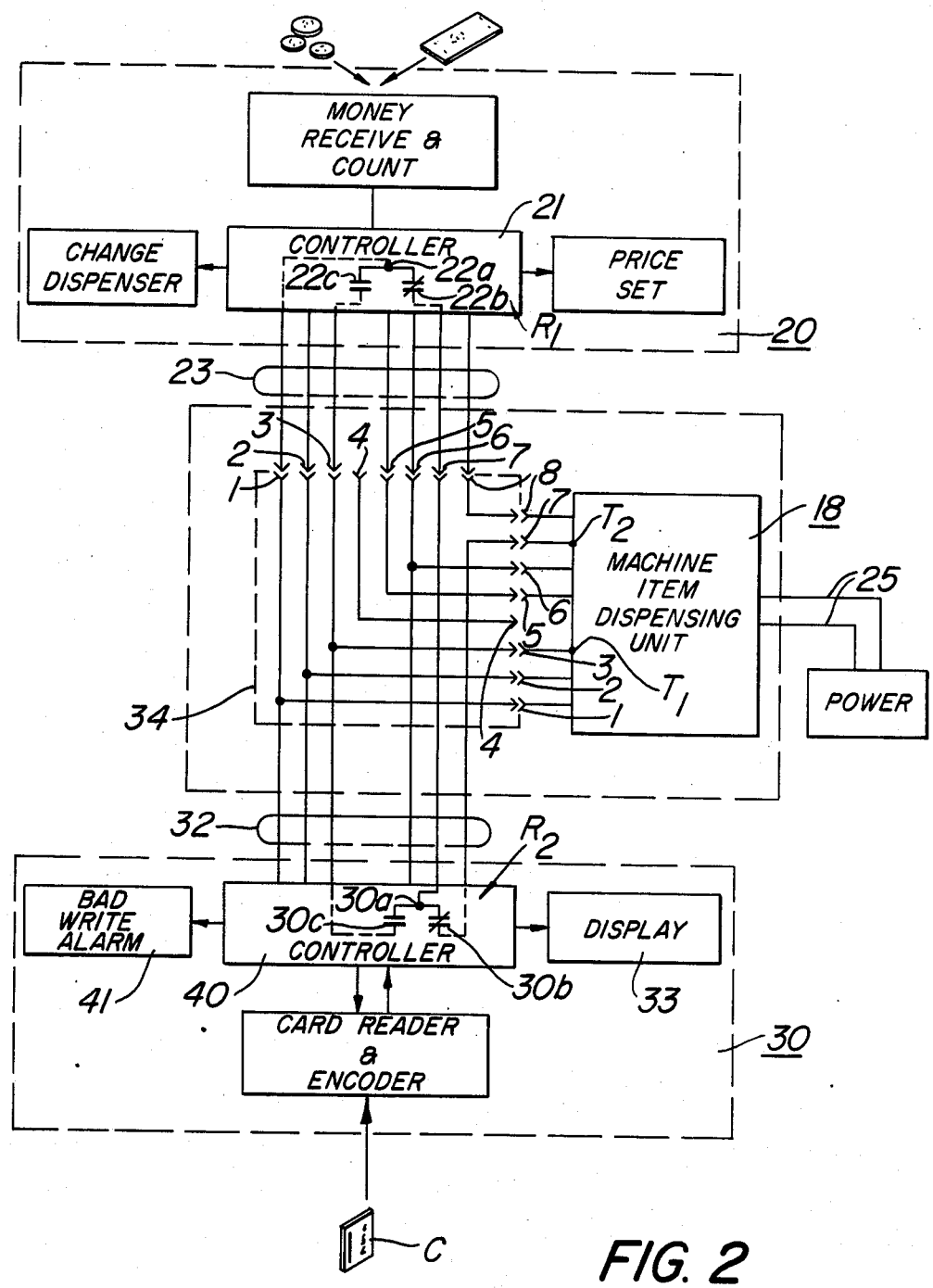
FIG. 2 is a schematic diagram illustrating the functional interaction of the accessory of the present invention with various vending machine components.

FIG. 2 illustrates schematically the manner in which the money handling unit 20 is electrically connected to the item dispensing unit 18 using the plug 22 and socket 24 and their respective pin and hole connections 1–8. When the plug 22 and socket 24 are matingly engaged in the conventional manner, the pins on the plug 22 connect to the holes in the socket 24 in the manner illustrated by the solid lines within the area 34 indicated by dashed lines. Thus, the connections 1, 2 provide the AC hot and neutral interconnects, respectively between the item dispensing unit 18 and the money handling unit 20; the connections 3 provide the so-called vend normally open interconnects; the connections 5 provide the exact change interconnects; the connections 6 provide the so-called CREM interconnects; the connections 7 provide the vend normally closed interconnects; and the connections 8 provide the escrow interconnects.

For producing an output vend signal, the controller section 21 of the money handling unit 22 has a relay $R_1$ with a common terminal 22a connected to a voltage source, a normally closed terminal 22b and a normally open terminal 22c.

In operation, when coins in an appropriate amount are placed in the receiving slot of the money handling unit 20, the controller relay $R_1$ thereof momentarily closes and causes a voltage to be applied to terminal 22c and, via the plug and socket interconnects, to a first input terminal $T_1$ of the item dispensing unit 18. The presence of voltage at such a location causes the item dispensing unit 18 to release an item from its storage position and to deliver the same to the delivery chute 16. Simultaneously, the money handling unit controller relay $R_1$ removes voltage from its terminal 22b, and via the plug and socket interconnects, removes voltage from a second input terminal $T_2$ of the item dispensing unit 18. Because the functions of the exact change, CREM and escrow interconnects are well known to those skilled in the art, and because such connections play no significant part in the operation of the present invention, their function will not be described in detail hereinafter.

In the conventional single-price vending machine, the plug 22 in the socket 24 and the aforedescribed electrical connections made between the money handling unit 20 and the item dispensing unit 18 provide the aforedescribed coin actuated vending machine operation. While vending machines of this construction operate entirely satisfactorily, they suffer from the limitation of requiring money, either by way of coin or bills, to dispense an item.

In accordance with the present invention, an accessory 30 is provided for use in conjunction with the conventional vending machine 10 to enable it to be operated using either money or coded cards. The accessory 30 is specially designed to be installed as a retrofit on existing vending machines of conventional design and interconnected therewith quickly and easily without requiring workmen having special skills or tools. For instance, the accessory 30 of the present invention is mounted to the outside of the vending machine housing 12 as by bolts, metal screws or the like and is connected internally without requiring machine rewiring.

To this end, the accessory 30 has a cable 32 which extends into the vending machine housing 12 and mounts an adapter 34 at its terminal end. The adapter 34 releasably interconnects directly between the plug 22 of the money handling unit 20 and the socket 24 of the item dispensing unit 18. As a result, the accessory 30 may be quickly and easily installed on a vending machine 10 to retrofit the same for use with either money or coded cards, requiring only modest mechanical skills and virtually no electrical skills.

The card handling accessory is easy to operate. For this purpose, as best seen in FIG. 2, the accessory 30 includes a front located card receiving slot 31 into which a coded card having one or more magnetic strips may be inserted. Data encoded on the magnetic strips of the coded card C is read by a card reader and encoder of conventional construction contained within the accessory housing and connected to a controller 40 which includes a programmed microprocessor. The data encoded on the card C is fed into the microprocessor which displays the amount on the LED display 33. The value encoded on the card is compared with the programmed price required to vend an item, and if the amount is sufficient, the microprocessor sends the appropriate vend signal to the item dispensing unit 18. At the completion of the computation, the microprocessor deducts the amount of the item selected from the amount originally encoded on the card C as the card C is withdrawn from the slot 31. In the event of improper encoding during card withdrawal, a bad write alarm 41 is sounded allowing the purchaser to reinsert the card for reencoding the same. With this type of vending machine, the card C may be encoded with value at another machine which accepts money and encodes cards, or the card C may be purchased having a predetermined amount already encoded thereon.

The accessory 30 is powered via the adapter 34 and cable 32, and vend signals are supplied to the item dispensing unit 18 by the same means. To this end, the cable 32 includes a plurality of wires which are interconnected in the adapter 34 in the manner illustrated schematically in FIG. 2. Preferably, the adapter 34 includes a single body mounted on the end of the cable 32; however, it should be understood that the adapter 34 may comprise two separate members: a male section and a female section, as long as they are electrically connected in the manner described and capable of being matingly engaged with the plug 22 and socket 24 as described.

The accessory 30 is capable of being used either with a vending machine requiring a voltage at the terminal $T_1$, or at the terminal $T_2$ of the item handling unit 18. To this end, the controller section 40 of the card handling unit 30 is provided with a relay $R_2$ having a common terminal 30$a$, a normally closed terminal 30$b$ and a normally open terminal 30$c$ which functions as an output signal lockout means in a manner to be described.

When a card C having an appropriate coded value amount is inserted in the card handling unit 30, the relay $R_2$ of its controller 40 closes and causes a voltage to be applied to its terminal 30$c$, and via adapter 34 interconnections, to the first input terminal $T_1$ of the item dispensing unit 18 for dispensing an item. Opening of the card unit controller relay $R_2$ simultaneously removes voltage from the second input terminal $T_2$ of the item dispensing unit 18. Thus, a voltage signal at terminal $T_1$, supplied by either the money handling unit 22 or the card handling unit 30 effects a vend, the card handling controller relay $R_2$ preventing a voltage from being supplied simultaneously to the normally closed input terminal $T_2$ of the item dispensing unit 18 to perform a signal lockout function.

In certain types of vending machines, the absence of a voltage signal at input terminal $T_2$ causes the item dispensing unit 18 to vend an item. In the money handling unit 20, this is effected upon momentary opening of the normally closed contacts of its controller relay $R_1$. With the card handling unit 30 of the present invention, such action is effected by momentary opening of the normally closed contacts of the controller relay $R_2$.

Figure 4:
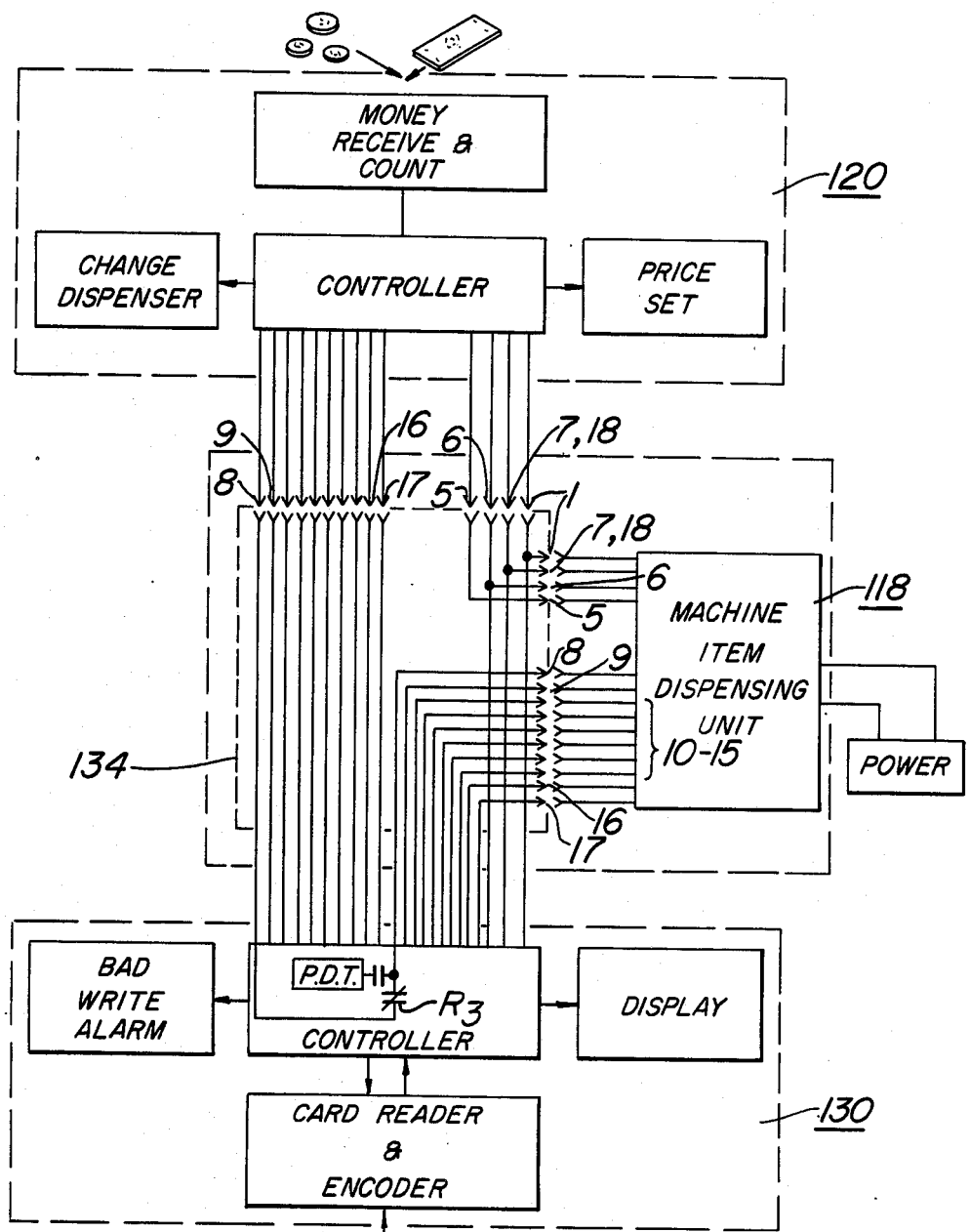
FIG. 4 is a schematic diagram similar to FIG. 2 but illustrating a ten-price type of vending machine interconnect.

The accessory 30 has been described operating a conventional single-price vending machine using either coins or coded cards. With appropriate internal and external modification, it is capable of being used with other types of vending machines such as the so-called ten-price vending machines. To this end, reference is made to FIG. 4 which illustrates schematically the manner in which the accessory is modified to interconnect with the ten-price vending machine.

With a ten-price type of vending machine, when money is used and one of the buttons on the machine is pressed signifying a selection, the signal travels via one of the ten individual price lines to the money handling unit 120. If the amount received in the money handling unit is sufficient to cover the amount of the item selected, a vend signal is returned to the item dispensing unit 118 over the same line. The selected item is then discharged to the delivery chute.

According to the present invention, the accessory 130 is interconnected with the item dispensing unit 118 and the money handling unit 120 by means of an adapter 134. The adapter has eighteen male and female connections arranged in a pattern to interconnect with the female socket 124 connected to the item dispensing unit 118. In this embodiment a means is provided for interrupting the price lines between the item dispensing unit 118 and the money handling unit 120 and for connecting the price lines to a microprocessor in the card handling unit which sends a compatible vend signal back to the item dispensing unit 118.

For this purpose, the controller section of the card handling unit 130 is provided with a double throw relay $R_3$ having normally closed contacts in each price line, such as in price line one corresponding to adapter location 8. In addition, the relay $R_3$ has normally open relay contacts provided for each price line. The common of the relay $R_3$ is connected to the item dispensing unit 118. The normally open contacts of relay $R_3$ are connected to price detecting and triac circuitry, PD&T, which is controlled by a microprocessor within the controller.

In the present invention, when a coded card C is inserted in the card handling unit 130, the normally closed relay contacts open and the normally open relay contacts close. Thus, the item selection signal is routed to the price detection and triac circuitry within the controller of the card handling unit 130, processed therein, and returned to the item dispensing unit 118 as a vend signal on the same line on which it comes in.

Figure 5:
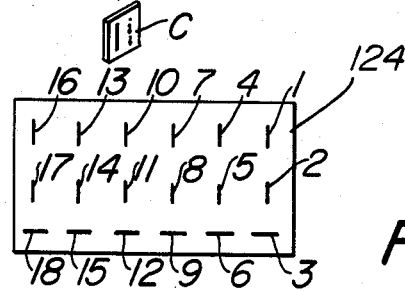
FIG. 5 is a plan view of hole locations in a ten-price machine dispensing unit socket.

As with the previous embodiment, the pin and hole locations in the adapter 134 and their connections to the card handling unit are important in providing a universal ten-price accessory 130. The locations of the various pins and holes are shown in FIG. 5 which is a plan view of the female socket connected to the item dispensing unit 118. Thus, connection 1 is AC hot; connections 7 and 18 are AC neutral; 6 is the CREM connect; 5 is the exact change interconnect; and 8 through 17 are the price lines 1–10, respectively.

The accessory also operates with so-called micro-mech machines. So-called micro-mech machines have several lines over which change dispensing signals are sent. According to the present invention, a means is provided for preventing change from being dispensed when a card is in use with a micro-mech type vending machine. In addition, the accessory 230 permits the coded card to be loaded, i.e., its value increased, when used with micro-mech type machine simply by inserting money in the money handling unit and depressing the conventional coin release mechanism on the vending machine.

To this end, the accessory is modified in the manner illustrated in FIGS. 6 and 7. As best seen therein, the accessory 230 is connected to the item dispensing unit 218 and to the money handling unit 220 via the adapter 234. The pin and socket locations on the adapter 234 are indicated in FIG. 7 which shows the female socket connected to the item dispensing unit 218. The corresponding adapter locations have like numbers. Thus, adapter and socket location 1 corresponds to +5 VDC; 2 corresponds to ground; 3 corresponds to a send signal line; 4 corresponds to an interrupt signal line; 5 corresponds to a data signal line; 6 corresponds to an acceptor enable signal line from the controller; 7 corresponds to a dispense 25¢ signal line; 8 corresponds to a dispense 10¢ signal line; 9 corresponds to a dispense 5¢ signal line; 10 corresponds to a −120 VDC; 11 corresponds to a reset signal line; and 12 corresponds to a +120 VDC.

An AND logic gate is connected in each of the lines 6, 7, 8 and 9 and to internal circuitry 250 within the card handling unit 230 which disables the money handling unit 220 when a card is in use.

When money is used with this type machine and a selection is made by pressing one of the selection buttons on the vending machine, line 4 goes low to tell the controller that there is some data to send. Next line 3 goes low to tell the item dispensing unit 218 to go ahead and send the data. The data is sent twice over line 5.

When a coded card C is used, the AND gates are operated by means of the circuitry 250 to disable the signal lines going to the money handling unit 220 so that no change can be dispensed while a card C is in use.

With micro-mech types of vending machines, signals are sent to the machine item dispensing unit 218 over interrupt and data lines 4 and 5, respectively. The money handling unit 220 simply tells the item dispensing unit 218 how many items of a particular money value it has received, and means within the machine item dispensing unit calculates the total and displays the same. After an item selection has been made, the means within the machine item dispensing unit subtracts the cost of the item selected from the amount displayed and sends signals to the coin dispensing section of the money handling unit 220 over send and accept enable lines 3 and 6 to dispense the correct amount of change.

When a card C is in the card handling unit 230 and money is inserted in the money handling unit 220, the data indicating amount of money received is sent both to the item dispensing unit 218 and to the card handling unit controller 230 via the adapter and cable interconnects illustrated in FIG. 6. The amount displayed on the vending machine is loaded on the card by depressing the conventional coin return button $B_1$ which normally would send an appropriate signal over the change dispense lines to cause the change dispenser portion of the money handling unit to dispense change. In the present invention, however, the AND gates prevent any change dispense signals from being sent to the change dispenser; instead the amount inserted in the money handling unit 220 is transferred to the card handling unit 230 and encoded on the card C.

While preferred embodiments of the present invention have been described in detail, various modifications, alterations and changes may be made without departing from the spirit and scope of the present invention as defined in the appended claims.

We claim:

1. In combination with a pre-existing vending machine having walls defining a housing containing therewithin means for handling money and producing an electrical output signal in response to received money, electrically actuated means responsive to said output signal for dispensing a selected item from the machine, and mating plug and socket means providing a releasable electrical connection coupling said money handling and item dispensing means, an accessory retrofitted to said vending machine for permitting use of either money or a coded card to vend an item from the machine comprising:

a separate card handling means mounted in retrofit relation to a wall of said machine housing for receiving a coded card carrying machine readable stored data thereon, and in response to predetermined coded data, producing a data generated output signal for actuating said item dispensing means;

cable means connected to said card handling means for receiving said data generated output signal therefrom, said cable means extending between said card handling means on said housing wall and said plug and socket means in the interior thereof; and adapter means carried by and electrically connected to said cable means for releasably matingly engaging said vending machine plug and socket means in said housing and thereby electrically coupling said card handling means to said money handling means and said item dispensing means for permitting said data generated output signal from said card handling means to actuate said item dispensing means;

whereby a pre-existing money operated vending machine may be field retrofitted readily to operate either with money or with a coded card.

2. Apparatus according to claim 1 wherein said cable means includes a multi-wire cable electrically connected at one end to said card handling means, and said adapter includes a plug and a socket electrically connected to the other end of said cable, said plug adapted to be inserted in said vending machine socket means and said socket adapted to receive said vending machine plug means.

3. Apparatus according to claim 1 wherein said data generated output signal corresponds substantially to the output signal produced by said money handling means, and said adapter means connects said money handling means and card handling means in electrical relation with said item dispensing means so that said vending machine can be operated with either money or a coded card.

4. Apparatus according to claim 1 wherein said card handling means includes means responsive to said output signal produced by said money handling means for determining the amount of money received, and means for encoding said amount as data on said card.

5. Apparatus according to claim 1 wherein said card handling means includes means for displaying the amount of credit encoded on the card.

6. Apparatus according to claim 1 wherein said card handling means includes means for producing an alarm in response to improper card encoding upon completion of a vend cycle.

7. Apparatus according to claim 1 wherein said cable means is connected to said card handling means and to said adapter for supplying power to said card handling means from said item dispensing means.

8. Apparatus according to claim 1 wherein said money handling means includes a relay having a normally closed contact for sending said output signal to said item dispensing means and wherein said card handling means includes relay means providing a normally closed signal path connected in electrical series relation with said money handling unit relay via said adapter and cable.

9. Apparatus according to claim 1 wherein said item dispensing unit includes a series of price lines for sending item selection signals to said money handling means and for receiving vend output signals therefrom, and said card handling means includes a like series of price lines linked internally to a microprocessor and relay means connected to said cable means and said adapter means and operable when a card is in said card handling unit to interrupt each price line between said item dispensing means and said money handling unit and to connect said like series of price lines to said item dispensing means.

10. Apparatus according to claim 1 wherein said money handling means includes means for dispensing change, and said card handling means includes means connected to said cable and adapter means and operable in response to the presence of a card in said card handling means to prevent said change dispensing means from dispensing change.

11. A vending machine, comprising:

a pre-existing housing having walls defining an enclosure for containing items to be dispensed;

means in said housing for handling money and producing an electrical output signal in response to received money;

a separate card handling means mounted in retrofit relation to one of said housing walls for receiving a coded card and producing an electrical signal like said first mentioned signal in response to coded data on said card;

electrically actuated means in said housing responsive to one of said output signals for dispensing a selected item from the machine;

means for supplying power to said item dispensing means in said housing;

a plug in said housing connected to said money handling means;

a socket in said housing connected to said item dispensing means;

adapter means in said housing releasably electrically connected to said plug and to said socket; and cable means extending between said card handling means and said plug and socket for interconnecting said adapter means in said housing and said card handling means mounted to said housing wall;

said adapter means supplying power to said card handling means from said item dispensing means;

whereby said machine can be field retrofitted to operate using either money or a coded card.

12. A vending machine, comprising:

a pre-existing housing having walls defining an enclosure for containing items to be dispensed in response to an item selection signal;

means in said housing for handling money and producing an electrical output signal in response to received money;

a separate card handling means mounted in retrofit relation to one of said housing walls for receiving a coded card and producing an electrical output signal like said first mentioned output signal, said card handling means including microprocessor means for processing said item selection signal;

electrically actuated means in said housing responsive to one of said output signals for sending a signal to said money handling means over one of a series of lines and for receiving a signal from said money handling means over said one line and for dispensing a selected item from the machine;

a plug in said housing connected to said money handling means;

a socket in said housing connected to said item dispensing means;

adapter means in said housing releasably electrically connected to said plug and to said socket;

cable means extending between said adapter means and said card handling means for interconnecting said adapter means and said card handling means retrofitted to said housing wall;

relay means in said card handling means for interrupting said series of lines and for connecting the same to said microprocessor means therein;

said adapter means and said cable means connecting said item dispensing means to said relay means of said card handling means;

whereby the vending machine can be field retrofitted easily to operate using either money or a coded card.

13. A vending machine, comprising:

a pre-existing housing having walls defining an enclosure for containing items to be dispensed;

means mounted in said housing for handling money and producing an electrical output signal in response to received money;

said money handling means having means for dispensing change;

a separate card handling means retrofitted to one of said housing walls for receiving a coded card and producing an electrical signal like said first mentioned signal in response to coded data on said card;

said card handling means having means for disabling said change dispensing means in response to the presence of a coded card therein;

electrically actuated means in said housing responsive to one of said output signals for dispensing a selected item from the machine;

a plug in said housing connected to said money handling means;

a socket in said housing connected to said item dispensing means;

adapter means in said housing releasably matingly electrically connected to said plug and socket;

cable means connecting said adapter means in said housing to said card handling means;

said adapter means and said cable means connecting said change dispensing disabling means of said card handling means to said change dispensing means of said money handling means;

whereby the vending machine can be field retrofitted easily and operated using either money or a coded card.

14. A vending machine according to claim 13 wherein said item dispensing unit has means for calculating the total amount of money received by said money handling unit, a money release means, and means for sending a change dispense signal to said change dispensing means in response either to depression of said money release or to over payment of money, said adapter and cable interconnecting said card handling unit to said item dispensing means operable when said money release means is activated to cause value to be encoded on said card in an amount corresponding to the amount inserted in said money handling means.

* * * * *